United States Patent Office 2,803,748
Patented Aug. 20, 1957

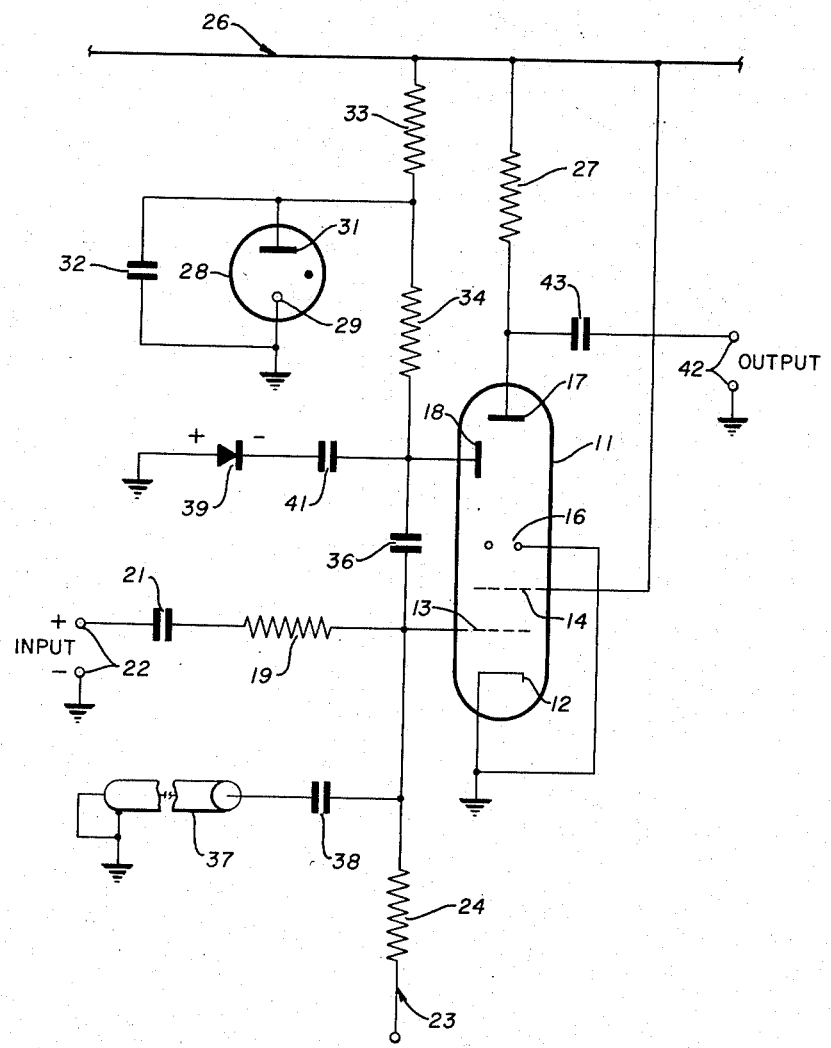

2,803,748

ONE SHAKE GATE FORMER

Ralph Kalibjian, Livermore, and Victor Perez-Mendez, Berkeley, Calif., assignors to the United States of America as represented by the United States Atomic Energy Commision Application September 19, 1956, Serial No. 610,874

4 Claims. (Cl. 250—27)

The present invention relates generally to the production of square pulses of electrical energy, and more particularly, to an improved circuit for forming square pulses having substantially short and precise time durations.

Various circuits are known for producing electrical pulses of substantially precise time durations, which pulses are hereinafter conventionally referred to as gate pulses for the sake of convenience. Conventional gate pulse generating circuits, e. g., various relaxation oscillators, in general employ a vacuum tube to which is applied a control wave of voltage and which is unaffected by undesired pulses. The duration of gate pulses generated in response to such control wave is usually controlled by the time constant of a resistance-reactance circuit, although in the past several decades pulse delay lines and the like have been utilized to control pulse durations with relatively greater precision.

The previous difficulties encountered with gate pulse generating circuits of the foregoing type have resided in certain inherent electrical properties of the conventional receiving type vacuum tubes (conventional triodes, pentodes, and the like) employed therein. For example, such inherent vacuum tube properties as input capacitance, electron transit time, and peak power rating of conventional vacuum tubes seriously limit the rise and fall time of the leading and trailing edges, respectively, of the generated gate pulses thereby minimizing the precision with which same are formed, and in addition, restrict the minimum time duration, maximum repetition rate, duty cycle, and maximum power capabilities thereof.

The present invention overcomes the foregoing limitations and disadvantages by providing an improved pulse forming circuit which employs a secondary emission vacuum tube in conjunction with a short-circuited pulse delay line to produce very precise pulses having substantially short time durations in the order of a shake ($10^{-8}$ second). Furthermore, because of the improved characteristics of secondary emission tubes as affects the present invention compared with those of conventional vacuum tubes, the instant circuit is additionally capable of relatively fast pulse repetition rates on the order of 1 megacycle at a duty cycle of the order of 10%.

The present invention is therefore variously useful as a source of substantially short precise gate pulses having wide application in a variety of electrical timing systems wherein it is desirable to accurately time an event in an electrical circuit by means of the initiation of an electrical pulse and to time a second event after a precise predetermined interval corresponding to the duration of such pulse, e. g., in modulated-carrier television transmitters where certain of the timing pulses form component parts of the transmitted signal. Precise gate pulses are also widely employed in various nuclear research instruments such as time-of-flight spectrometers for the purpose of providing a calibrated time base for accurately determining time events of electrically charged particles, in high speed computing and data processing systems for actuating integral circuits in appropriate time sequence and for suitable time durations, and in many other apparatus for manifold utilitarian purposes.

Accordingly, it is an object of the present invention to provide means for generating very precise substantially short gate pulses.

It is another object of the invention to provide a stable pulse generating circuit.

Still another object of the present invention is to provide gate pulses at a fast repetition rate and large duty cycle.

One further object of the invention is to provide a circuit for generating gate pulses having substantially short rise and fall times.

The invention, both as to its organization and method of operation, together with further objects and advantages thereof, will best be understood by reference to the following specification taken in conjunction with the accompanying drawing, of which the single figure is a schematic wiring diagram of a preferred embodiment of the present invention.

Referring now to the drawing, the gate forming circuit of the present invention is seen to generally comprise a secondary emission vacuum tube, preferably a secondary emission R. F. pentode, adapted to receive input trigger pulses and having a positive feedback loop connected from the dynode to the control grid thereof to maintain conduction in response to such trigger pulses. A short-circuited pulse delay line is employed at the control grid for the purpose of precisely controlling the conduction time of the secondary emission tube and a circuit for squelching spurious oscillations is provided in the feedback loop whereby gate pulses having very precise time durations are derived at the anode of such tube only in response to input trigger pulses.

More specifically there is provided in a preferred embodiment of the gate forming circuit of the present invention, a secondary emission R. F. pentode 11 (e. g., an EFP 60) having cathode 12, control grid 13, screen grid 14, suppressor grid 16, anode 17 and dynode 18.

The cathode 12 is connected to ground and control grid 13 is connected through a coupling resistor 19 in series with a blocking capacitor 21 to the positive one of conventional input terminals 22 the negative one of which is connected to ground.

Pentode 11 is normally biased below cutoff by means of a suitably negative grid bias source as shown generally at 23 connected to one side of a bias resistor 24 the other side of which is connected to control grid 13. Pentode 11 is thus responsive to positive trigger pulses applied to input terminals 22.

Screen grid 14 and suppressor grid 16 of pentode 11 are connected in a conventional manner, the former being connected to an appropriate positive potential source as shown generally at 26 while the latter is connected to ground. Similarly, anode 17 is coupled through a dropping resistor 27 to potential source 26 to provide appropriate anode operating potential.

A substantially constant operating potential is maintained at dynode 18, preferably by means of a voltage regulator tube 28 including a cathode 29 and anode 31 having a filter capacitor 32 coupled therebetween. The cathode 29 is connected to ground while anode 31 is coupled through a resistor 33 to potential source 26 thereby establishing a regulated voltage at dynode 18 which is coupled to anode 31 of the regulator tube 28 through a load resistor 34.

Upon conduction of pentode 11 in response to positive trigger pulses applied to input terminals 22, the potential at dynode 18 correspondingly increases rapidly as is subsequently explained in detail in regard to the operation of the present invention. Such potential increase maintains conduction of pentode 11 for periods greater than the duration of each input trigger pulse by means of a positive feedback loop, preferably a coupling capacitor 36 connected between dynode 18 and control grid 13.

Conduction of pentode 11 is precisely terminated after an interval of time determined by a pulse delay line 37 which is terminated in a short circuit to ground at one end extremity and connected at the other end extremity through a matching capacitor 38 to control grid 13.

Re-triggering of pentode 11 by spurious oscillations inherently established in the feedback loop between dynode 18 and control grid 13 through coupling to delay line 37 is prevented in the instant invention by means of a unidirectional grounding network coupled to the feedback loop at dynode 18 and passive only to voltage decreases occurring therein. The foregoing grounding network preferably comprises a rectifier 39 (e. g., a crystal diode) having anode and cathode, respectively connected to ground and coupled by means of a capacitor 41 to dynode 18. Consequently increases in potential occurring in the feedback loop experience an open circuit at rectifier 39 while decreases in potential render such rectifier conducting and are thereby short circuited to ground. Such short-circuiting action squelches spurious oscillations capable of re-triggering pentode 11 as is subsequently described in regard to the operation of the present invention. Gate pulses having precise time durations determined by delay line 37 are consequently formed at anode 17 only in response to positive trigger pulses impressed at input terminals 22.

In order that the foregoing gate pulses may be conveniently applied to any desired utilitarian equipment, conventional output terminals 42 are provided with one terminal connected through a coupling capacitor 43 to anode 17 and the other terminal connected to ground.

With the foregoing connections accomplished and the gate forming circuit suitably energized, positive trigger pulses applied to input terminals 22 are correspondingly impressed at control grid 13 of pentode 11 through blocking capacitor 21 and coupling resistor 19. Each positive pulse drives grid 13 above the cutoff bias maintained thereon by bias source 23 thus causing pentode 11 to conduct and the resulting electron stream emitted by cathode 12 to impinge upon dynode 18.

A multiplicity of secondary electrons are emitted by dynode 18 in response to the foregoing impinging electron stream, which secondary electrons are collected at anode 17. Since electrons flow through pentode 11 from dynode 18 to anode 17 then, observing established circuit current convention, a current correspondingly flows from dynode 18 through the external circuit including resistors 34, 33, 27 to anode 17. Consequently to establish such current flow, the potential existing at dynode 18 instantaneously rises above the quiescent value maintained thereon by voltage regulator tube 28.

The instantaneous voltage rise at dynode 18 is coupled to control grid 13 through feedback capacitor 36 thus maintaining conduction of pentode 11 for a time dependent upon the period required for said capacitor 36 to discharge through grid bias resistor 24 to a voltage value below the cutoff voltage of pentode 11. The time constant of the series combination of capacitor 36 and resistor 24 is chosen, however, such that the voltage pulse accordingly formed at control grid 13 does not decay below cutoff until a time greater than twice the delay time of delay line 37. Such voltage pulse being also applied through matching capacitor 38 to delay line 37 propagates a voltage along the line which is inverted and reflected upon experiencing the short-circuited end of the line, the inverted pulse front then returning to the grid end of the line after a time interval equal to twice the delay time of the line. During such time interval pentode 11 is maintained conducting, the voltage at control grid 13 having not as yet decayed below cutoff. The inverted negative pulse front upon returning along delay line 37 to control grid 13 then abruptly drives same below cutoff thereby terminating conduction of pentode 11 in a substantially precise manner after the above-mentioned time interval of twice the delay time of delay line 37.

Upon termination of conduction in pentode 11 spurious re-triggering of same at control grid 13 due to various phenomena inherently produced in delay line circuits is substantially eliminated by the action of the selective grounding network including rectifier 39 coupled to control grid 13 through feedback capacitor 36. Such undesirable re-triggering phenomenon as positive overshoot, i. e., a positive pulse occurring immediately after the reflected negative pulse terminating conduction of pentode 11 as applied to control grid 13 from delay line 37 in the case of a resistively matched line, would normally result from said reflected negative pulse. Similarly, if delay line 37 is slightly mismatched the reflected negative pulse would normally be followed by ringing, i. e., the persistence of oscillatory currents in a resonant circuit after removal of the E. M. F. originally producing same at grid 13. Consequently, since rectifier 39 presents a short circuit to ground to voltage decreases coupled thereto, the reflected negative pulse from delay line 37 applied to control grid 13 is short circuited to ground thereby substantially eliminating the cause of the foregoing associated undesirable phenomena capable of re-triggering pentode 11. The circuit of the instant invention is thus stabilized with respect to spurious oscillations whereby pentode 11 is rendered conducting only in response to positive trigger pulses applied to input terminals 22.

During conduction periods of pentode 11 the voltage at anode 17 necessarily drops due to the conduction current flowing through plate load resistor 27. A corresponding gate pulse is thus produced at anode 17 and delivered to output terminals 42 during each conduction period of pentode 11 which gate pulse is therefore of a duration substantially precisely equal to twice the delay time of the particular length of delay line 37 utilized.

With the circuit of the present invention constructed from conventional components and connected as shown in the accompanying drawing and hereinbefore described, it has been demonstrated in practice that such gate forming circuit is capable of generating very precise unidirectional gate pulses having rise times in the order of $8 \times 10^{-9}$ second and durations which may be varied through a range of from $15 \times 10^{-9}$ to $200 \times 10^{-9}$ second depending upon the length of shorted delay line 37 utilized. Furthermore the gate pulses may be generated at a reptition rate of 1 mc. and at a duty cycle of 10% due to the superior operating characteristics of secondary emission pentode 11.

While the invention has been disclosed with respect to a single preferred embodiment, it will be apparent to those skilled in the art that numerous variations and modifications may be made within the spirit and scope of the invention, and thus it is not intended to limit the invention except as defined in the following claims.

What is claimed is:

1. A pulse forming circuit comprising a secondary emission vacuum tube having at least cathode, control grid, dynode, and anode elements, potential means connected to said elements applying operating voltages to said vacuum tube, said control grid biased below cutoff with respect to said cathode, input terminals coupled between said control grid and cathode for connection to a source of trigger pulses of magnitude and polarity to render said tube conducting, a feedback loop connected between said dynode and said control grid, a pulse delay line having one end coupled to said control grid and the other end terminated in a short circuit, selective unidirectional grounding means coupled to said feedback loop and responsive to voltage decreases therein, and output terminals coupled to said anode.

2. A gate pulse generator comprising a secondary emission vacuum tube having at least cathode, control grid, dynode, and anode elements, said cathode connected to ground, positive potential means applying operating voltages to said dynode and anode, bias means coupled to said control grid biasing same below cutoff, input terminals coupled between said control grid and cathode for connection to a source of positive trigger pulses, a feedback capacitor connected between said dynode and said control grid, a pulse delay line having one end coupled to said control grid and the other end terminated in a short circuit to ground, a rectifier having an anode connected to ground and a cathode coupled to said dynode, and output terminals coupled to said anode.

3. A pulse generator comprising a secondary emission R. F. pentode having at least cathode, control grid, screen grid, suppressor grid, dynode, and anode elements, said cathode and said suppressor grid connected to ground, a positive voltage source coupled to said screen grid, dynode, and anode elements applying operating potentials thereto, a negative voltage source coupled to said control grid biasing same below cutoff, input terminals coupled between said control grid and said cathode for connection to a source of positive trigger pulses, a positive feedback loop connected between said dynode and said control grid, a pulse delay line having one end coupled to said control grid and the other end terminated in a short circuit to ground, selective unidirectional grounding means coupled to said feedback loop and responsive to voltage decreases therein, and output terminals coupled to said anode.

4. A pulse generator capable of generating pulses having very short precise time durations comprising a secondary emission R. F. pentode having at least cathode, control grid, screen grid, suppressor grid, dynode, and anode elements, said cathode and said suppressor grid connected to ground, a positive voltage source connected to said screen grid, a plate load resistor connected between said voltage source and said anode, a voltage regulator tube having at least anode and cathode elements, said cathode connected to ground, said anode connected through a dropping resistor to said voltage source, a filter capacitor connected between said regulator tube anode and cathode, a load resistor connected between said regulator tube anode and said dynode, a bias voltage source, a bias resistor connected between said bias voltage source and said control grid, a pair of input terminals, one terminal connected to ground, the other terminal connected to a coupling capacitor in series with a resistor connected to said control grid, a feedback capacitor connected between said dynode and said control grid, a pulse delay line having one end coupled through a matching capacitor to said control grid and the other end terminated in a short circuit to ground, a rectifier having anode and cathode elements, said anode connected to ground, said cathode capacitively coupled to said dynode, and a pair of output terminals, one terminal connected to ground and the other terminal capacitively coupled to the anode of said pentode.

No references cited.